United States Patent [19]
Unger et al.

[11] Patent Number: 5,597,852
[45] Date of Patent: Jan. 28, 1997

[54] METHOD AND APPARATUS FOR REPROCESSING SOLID POLYESTER MATERIAL

[75] Inventors: Reinhard Unger, Forst; Hartmut Sieckmann, Weimar; Karl-Heinz Wiltzer, Bad Blankenburg, all of Germany

[73] Assignee: Polymer Engineering GmbH, Germany

[21] Appl. No.: 235,297

[22] Filed: Apr. 29, 1994

[30] Foreign Application Priority Data

Apr. 30, 1993 [DE] Germany ............ 43 14 345.8

[51] Int. Cl.⁶ ............................... C08J 11/04
[52] U.S. Cl. ................. 521/48.5; 521/44; 521/48
[58] Field of Search .................. 521/48.5, 48, 44

[56] References Cited

U.S. PATENT DOCUMENTS

| | | | |
|---|---|---|---|
| 4,485,196 | 11/1984 | Speranza et al. | 521/48 |
| 5,236,959 | 8/1993 | Oakley et al. | 521/48.5 |
| 5,252,615 | 10/1993 | Rao et al. | 521/48 |
| 5,266,601 | 11/1993 | Kyber et al. | 521/48 |
| 5,308,892 | 5/1994 | Zickler et al. | 521/48.5 |

*Primary Examiner*—Morton Foelak
*Attorney, Agent, or Firm*—Ostrolenk, Faber, Gerb & Soffen, LLP

[57] ABSTRACT

A method to work-up waste material of polyethylene terephthalate (PET) in solid form and having a high initial viscosity for multivalent reuse and to recondense it to a high viscosity. The method includes the chemical regeneration and conversion of the recyclate in a mixture with a primary component in continuous and batchwise systems to form a homogenous product. The material to be reprocessed is heated in a stream of gas, crystallized, and dried. The solid-phase condensation is concluded in a stream of gas at high temperature. A transformation process is carried out by mixing the recycling material after treatment with a second component containing hydroxyl end groups.

15 Claims, 1 Drawing Sheet

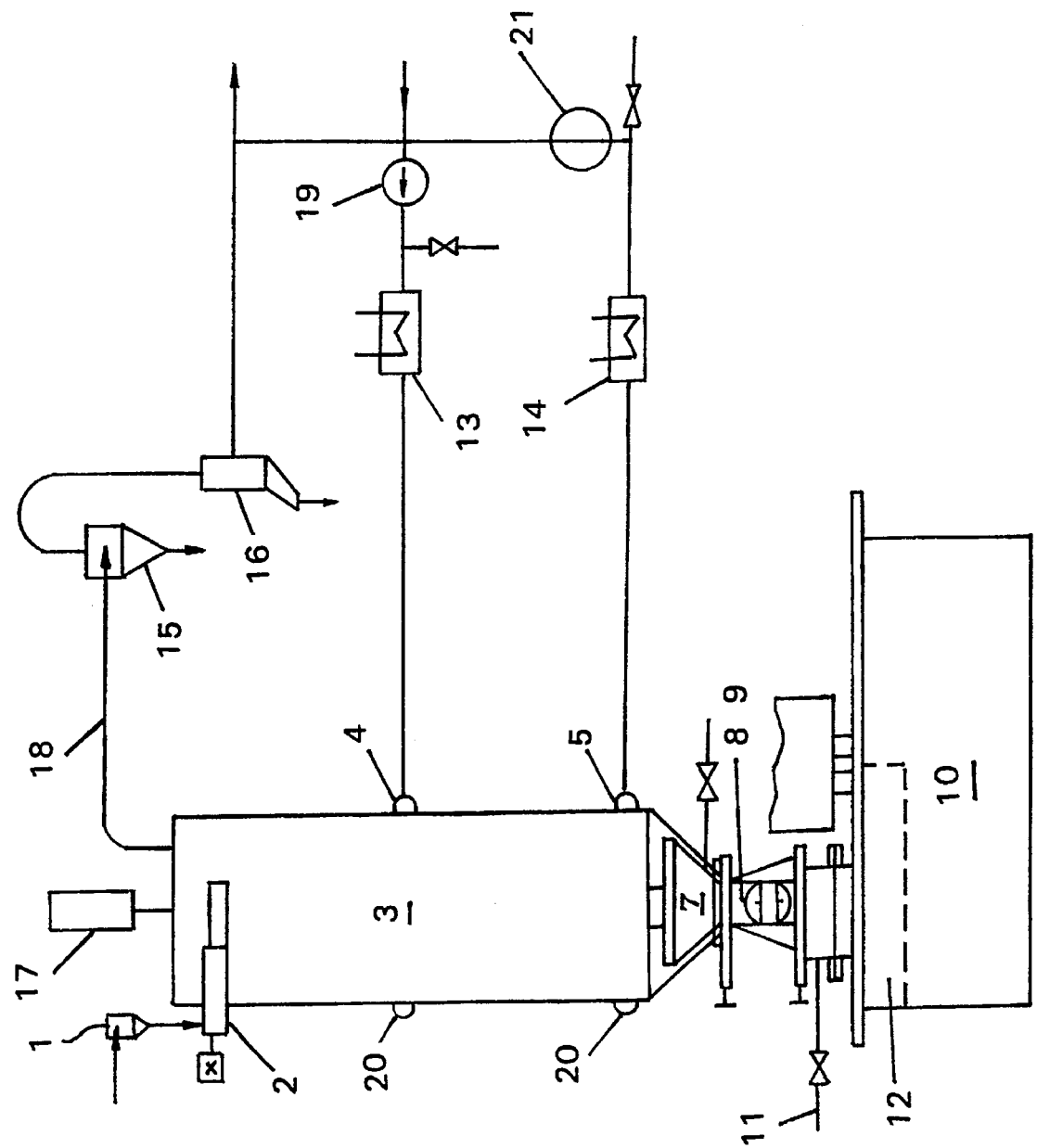

METHOD AND APPARATUS FOR REPROCESSING SOLID POLYESTER MATERIAL

BACKGROUND OF THE INVENTION

1. Field of the Invention

The present invention relates to a method for reprocessing solid polyester material and an apparatus for carrying out the method.

2. Description of Related Prior Art

Polyester material, such as polyethylene terephthalate or PET, substantially sorted and pure, results from recycling of material or as polyester educt. Methods which employ inert gas, vacuum and elevated temperature are known for processing polyester material in the solid phase. In such processes, the polyester is frequently subjected to specific conditions, as described in the German reference no. OS 31 05 767.

In a number of known methods for the recycling of polyethylene terephthalate (PET) production waste, the problem of melting mixed recycling material with glycol or dicarboxylic acid ester (esterification product) is solved, for instance, in the corresponding processing stage of the manufacturing process. In this procedure, as disclosed in British Patent 1 254 209, hydrolysis or glycolysis of the long-chain molecules and the mixing of thermally stressed and possibly damaged molecules with the reacting esterification product takes place. The material being treated must again pass through the esterification process and the polycondensation process with the thermal stressing inherent therein. Since all the substances that are present as a result of the equilibrium reaction, such as for instance aldehydes and ether compounds or cross-linked products, are introduced with the recycling material, side reactions cause defective places in the condensing polymer molecules.

Therefore, an object of the present invention is to provide a method, and an apparatus for carrying out the method, which makes it possible to work up a polyester material to a high-grade final product in a minimum processing time, with the smallest possible thermal stress, and with the admixing of the smallest possible amounts of the primary material.

SUMMARY OF THE INVENTION

This and other objects are achieved by a method for processing polyester waste in a continuously or batchwise operating system. The system comprises a reactor or prior container for the preparation of the recycling component as well as a melt reactor system. In the method of the invention, the recycling component is sintered at temperatures of about 140° C. to about 210° C. in a stream of gas in a first step. In a second step, the recycling material with a sintered structure is mixed after heating to a maximum temperature of about 230° C. with a polyester primary component and maintained in reactive state for a predetermined amount of time.

An apparatus for treating the recycling component includes a container having an inlet end and an outlet end for the development of a column of material comprising the recycling component. The container is provided with agitating and loosening devices and has at least one feed for the introduction of a gas heated to a temperature within the range of about 150° C. to about 250° C. The inlet end of the container has feed and metering devices for the feeding of the recycling component, and the outlet end of the container is connected in a controllable manner to an inlet of a melt reactor, which has a second inlet for the metered feeding of the primary component.

Other features and advantages of the present invention will become apparent from the following description of the invention which refers to the accompanying drawing.

BRIEF DESCRIPTION OF TEE DRAWING

FIG. 1 shows schematically an apparatus according to the present invention.

DETAILED DESCRIPTION OF PREFERRED EMBODIMENTS OF THE INVENTION

By the method of the invention, it is possible to work-up waste material of polyethylene terephthalate (PET) in solid form and having a high initial viscosity (recyclate) for multivalent reuse and to recondense it to a high viscosity. The method includes the chemical regeneration and conversion of the recyclate in a mixture with a primary component in continuous and batchwise systems to form a homogeneous product.

The material to be reprocessed (recycling component) is heated in a first step in a stream of gas, crystallized, and dried. The solid-phase condensation in this method is concluded in a stream of gas at high temperature. A transformation process is carried out in a second step by mixing the material which has been treated in the above manner with a second component, a condensate containing hydroxyl end groups. This condensate is present in, for example, a melt reactor.

The recycling component preferably contains a proportion of amorphous material of more than 80%. This component preferably has a density of more than 0.1 kg/L.

In the first step, the solid recycling component is freed in the stream of gas from all volatile components and reaction products and recondensed. The recycling component is preferably treated in the stream of gas at temperatures of about 140° C. to about 210° C. A structural change in the material takes place, comparable to a sintering effect. The recycling component is then heated further to at most 230° C. The material with the sintered recycling component is preferably condensed in a stream of air for a period of 120 minutes at about 190° C. to about 230° C.

After this period of treatment in the stream of air, nitrogen is preferably introduced into the recycling component at a temperature of about 200° C. to about 255° C.

In the second step, the recycling component, which has been pretreated in the above manner, reacts with a primary component that includes a high-molecular condensate containing hydroxyl end groups. By rearrangement reaction (polytransesterification is dominant), a polycondensate (reaction product) having a normal distribution of molecular weight in equilibrium condition is produced from the extremely long-chain recycling component which is poor in hydroxyl groups.

The recycling component is mixed in an amount of preferably up to 60% by weight of the total mixture of the recycling component with the primary component. The primary component preferably has a content of —COOH end groups of less than 35 µEq/g and a content of —OH end groups of more than 58 µEq/g. Prior to the admixing of the recycling component, the primary component preferably has a degree of polycondensation within the range of about 50 to about 135 units.

By the method in accordance with the invention, it is possible to obtain a low concentration of the reactants which bring about side reactions upon thermal stressing of the material during the processing, so that a melt of high quality is produced. Upon admixing the recycling component with the primary component, which contains hydroxyl end groups and the average molecular weight of which is below that of the recycling component, no glycolysis takes place but predominantly a polytransesterification occurs. Furthermore, upon admixing, there is no hydrolysis or methanolysis of the long-chain compounds of the recycling material. Therefore, a polymer melt mixture which is only slightly degraded upon reprocessing can be prepared. Furthermore, there are no uncontrollable subsequent reactions. The products produced from the material can be again processed as a result of the quality of the material obtained.

The apparatus in accordance with the invention preferably has a shaft-shaped container provided with an agitator and inserts (not shown) driven by a motor 17. The recycling component is introduced into the container in finely divided form via a conveyor and a volumetric metering.

Air or gas can be introduced into the container through feed points which are distributed over the height of the container. The temperature is between about 140° C. up to about 230° C., and a temperature gradient is produced.

In order to produce flowability, the agitator rotates the recycling component, which has been treated in the above manner, as a result of which, under the action of the inserts, the recycling component loses its compact structure and is divided-up and comminuted.

At the outlet, which is arranged at the lower end of the container, an agglomerate metering device is arranged. The recycling component, which has been treated, is discharged from the agglomerate metering, possibly via a conveyor worm and an air lock or, in the case of a continuous operation, via an extruder, into a melt reactor.

FIG. 1 shows a shaft-shaped container 3 provided with an agitator (not shown) and inserts (also not shown). A recycling component that has been suitably prepared for the method of the invention is introduced into the container 3 in finely divided form via preferably a pneumatic conveyor member 1 and a volumetric metering device 2. The recycling component is preferably a ground material having a density of more than 0.1 kg/L and has more than 80% amorphous material.

Air is introduced into the container 3 via an upper feed line 4. Gas at a temperature of about 200° C. to about 230° C., for the production of a temperature gradient, is introduced into the ground recycling material via a lower feed line 5. Each feed line preferably terminates in a ring line 20, which surrounds the container 3 in a generally ring shape perpendicular to a longitudinal axis of the container 3. Each ring line 20 is in communication with the inside of the container 3 via a plurality of openings distributed on the circumference of the container 3.

At temperatures of about 140° C. to about 210° C., surface effects occur, which may be ascribed to the molecular mobility as a result of the energy state reached, resulting in a change in the structure of the ground recycling material. Furthermore, the air introduced serves to remove the water adhering to the ground material, as well as other foreign volatile components, and to reduce the moisture of the material. In the upper temperature range of above 190° C., a solid-phase condensation takes place upon a drop below the equilibrium concentration of the ethylene glycol dissolved in the recycling component. The condensation leads to an increase in the degree of polymerization and a reduction in the content of hydroxyl end groups. For this, a density of the material of more than 0.1 kg/L is to be produced, the density being preferably within the range of about 0.2 to about 0.4 kg/L.

The recycling component is preferably treated for about 120 min. with the gas at a temperature of about 190° C. to about 230° C. Heated dry air is preferably used as a treatment gas. Depending on the manner of operation of the apparatus, which may operate continuously or batchwise, a suitable temperature gradient in the direction of the height of the container of between about 140° C. and about 230° C. is established.

In order to avoid forming supercrystallizing structures, a well-defined temperature-time program must be established. One of the prerequisites for the program is the production of a particle size of the material which is suitable for mass transfer and the mode of conveyance of the apparatus. In order to adapt the procedure to the desired quality features, the method permits recycling of the heating medium. The preparation and after-processing of the heating medium is obtained in an alternative procedure by passage over heat-transfer agents 13 and 14, separators/coolers 15 and 16, line 18, as well as pumps 19 and 21.

In order to produce the flowability, an agitator (not shown) rotates the treated recycling component, as a result of which, under the action of the inserts or baffles (also not shown), the recycling component is divided up and comminuted.

In this form, the recycling component passes, via a device acting as an agglomerate meter 7 via a conveyor worm 8 and an air lock 9, or via an extruder which takes the place of the air lock 9 in a continuously operating apparatus, into a melt reactor 10. It is possible to hold material in a storage compartment or buffer container 12 of the melt reactor 10, without causing a reduction in quality. The primary component is introduced in metered form into the melt reactor 10 via a line 11. The primary component is prepared previously as a polycondensate with a high concentration of hydroxyl end groups.

The reaction between the primary component containing the hydroxyl end groups and the recycling component fed in solid form then takes place in this melt reactor 10. For this purpose, the agglomerate and the primary component present pass, with continuous supply of heat, into a liquid state. The mixing temperature in this connection can be about 280° C.

As a result of desorption, the primary component gradually condenses in the molten mixture formed of the two components, while simultaneously, due to this the transformation of the material fed in a solid phase is effected in an equilibrium reaction.

The desired advance of the reaction should be realized, with a suitable carrying out of the process, within a time of about 120 min. The degree of polycondensation finally obtained is due, in particular, to the minimizing of the diffusion resistances, the mobility or energy state of the molecules and the extent of the polyesterification reaction brought about in the second process stage of the solid-phase condensation. Thus, in the course of a short time of treatment, the mixture in the melt container reacts at normal pressure or under vacuum to form a homogeneous polymer melt which can be discharged in the form of bars or strips.

In the method described, the ratio of end groups required for reuse and the required viscosity can be adjusted solely by the quantity of agglomerate fed, in view of the presence of the primary component containing hydroxyl end groups.

An after-condensation in the liquid state is also possible in a conventional manner. The concentration of —COOH end groups does not exceed the starting value or is at most 15 µEq/g above the starting value, of the recycling component used.

In order to establish a well-defined equilibrium condition for the controlled reprocessing of the reaction product, which includes more than 50% recycling component the properties of which may not be homogeneous and similar, the mixture is maintained for up to at most 45 minutes in a molten state and during this time subjected to a measurement of the viscosity and of the degree of dissociation. The degree of polycondensation of the primary component present is 25 units greater and is preferably 120 units. Preferably, the polyester primary component has a degree of polycondensation within the range of about 50 to 135 units prior to mixing with the recycling component.

EXAMPLE 1

Upon processing, and after introduction of polyester non-wovens, there are obtained amounts of material (compressed in the form of bales in order to reduce the cost of transportation) for physical reprocessing. This starting material is conveyed through a cutting device and thereby divided into portions. The continuous stream of material produced passes, after grinding, via a worm conveyor into the vertical recycling-product container 3 in which the column of material resulting here, which has a density of 0.25 kg/L, is heated in a stream of air. The column of material is brought to 190° C. within 50 minutes, sintered, and then held at this temperature for at most 15 minutes. The development of the desired temperature gradient permits the removal of the volatile components with minimum thermal stressing. By further introduction of gas, air is introduced with an effective temperature of 245° C. and the material is treated with it for a further 15 minutes before it is fed, via the conveyor member in further comminuted and sintered form, to the extruder at the outlet of the container 3. The material passes through the latter into the melt reactor. In this embodiment, the melt reactor has the form of a flow pipe with separate entrance connections for the primary and secondary components, a static mixer, and an outlet connection. The reaction mixture of the primary component having a degree of polycondensation of 35 units and a concentration of carboxyl end groups of 19 µEq/g and the recycling component having non-homogeneous chemical properties, after discharge, cooling and bar granulation, shows in the granulate mixture good quality features, no thermal damage, a degree of polycondensation of 135 units, and a ratio of carboxyl to hydroxyl end groups of on the average 1:2.

In this way, multiple, repeated processing of the product is assured.

EXAMPLE 2

The polyester hollow-body fraction from a plastic waste sorting is finely ground after cleaning and conveyed batchwise into the container 3. As a result of the particle size distribution that is established and the action of gas, a column of material of a density of 0.35 kg/L is formed in the container. After reaching the temperature of 190° C., air is passed for 40 minutes through the recycling component. By increase of the temperature of the air to 245° C. the solid-phase condensation takes place. Via the second feed line 5, the material is then acted on by nitrogen having a temperature of 235° C. The time of treatment is 60 minutes.

The process of feeding the ground material to the reaction container is carried out as a function of the moment of rotation of the agitator.

Within the melt reactor, the recycling component in the primary component having the above-indicated properties present here melts upon continuous heating at 285° C. By polytransesterification reaction for a period of 25 minutes, a product which can be reused is obtained, having a degree of polycondensation of 135 units and a concentration of carboxyl end groups of 21 µEq/g.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for reprocessing polyester waste, comprising the steps of:
   (a) sintering the polyester waste to be reprocessed at a temperature of about 140° C. to about 210° C. in a stream of gas;
   (b) mixing the sintered waste with a polyester having a degree of polycondensation within the range of about 50 to 135 and having hydroxyl end groups after heating to not more than 230° C.; and
   (c) maintaining the mixture in a reactive state for a predetermined amount of time.

2. A method according to claim 1, wherein the polyester waste is more than 80% amorphous.

3. A method according to claim 1, wherein the polyester waste is mixed in Step (b) with an amount of up to 60% by weight of the mixture in the hydroxyl-containing polyester.

4. A method according to claim 3, wherein the hydroxyl-containing polyester has less than 35 µEq/g of —COOH end groups and more than 58 µEq/g of —OH end groups.

5. A method according to claim 1, wherein the hydroxyl-containing polyester has less than 35 µEq/g of —COOH end groups and more than 58 µEq/g of —OH end groups.

6. A method according to claim 1, wherein the polyester waste is maintained in a reactive state for not more than 45 minutes.

7. A method according to claim 1, further comprising the step of maintaining the sintered waste in a stream of air for about 120 minutes at 190° C. to 230° C. before the mixing step (b).

8. A method according to claim 7, further comprising the step of introducing nitrogen having a temperature of 200° C. to 255° C. into the polyester waste after treating the polyester waste for about 2 hours in a stream of air, and before the mixing step (b).

9. A method according to claim 3, further comprising the step of maintaining the sintered waste in a stream of air for about 120 minutes at 190° C. to 230° C. before the mixing step (b).

10. A method according to claim 9, further comprising the step of introducing nitrogen having a temperature of 200° C. to 255° C. into the polyester waste after treating the polyester waste for about 2 hours in a stream of air, and before the mixing step (b).

11. A method according to claim 10, wherein the polyester waste is polyethylene teraphthalate.

12. A method according to claim 11, wherein the polyester waste is maintained in a reactive state for not more than 45 minutes.

13. A method according to claim 12, wherein the polyester waste is more than 80% amorphous.

14. A method according to claim 13, wherein the polyethylene teraphthalate waste has a density of greater than 0.1 kg per liter.

15. A method according to claim 1, wherein the polyester waste is polyethylene teraphthalate.

* * * * *